(12) United States Patent
Xie et al.

(10) Patent No.: US 11,233,545 B2
(45) Date of Patent: Jan. 25, 2022

(54) METHOD FOR WIRELESS DATA COMMUNICATION AND A COMMUNICATION APPARATUS

(71) Applicants: CHONGQING BOE SMART ELECTRONICS SYSTEM CO., LTD., Chongqing (CN); BOE Technology Group Co., Ltd., Beijing (CN)

(72) Inventors: Yunyan Xie, Beijing (CN); Lichun Chen, Beijing (CN); Bo Liu, Beijing (CN); Qiangeng Cheng, Beijing (CN); Han Wang, Beijing (CN)

(73) Assignees: CHONGQING BOE SMART ELECTRONICS SYSTEM CO., LTD., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/762,992

(22) PCT Filed: Dec. 9, 2019

(86) PCT No.: PCT/CN2019/123894
§ 371 (c)(1),
(2) Date: May 11, 2020

(87) PCT Pub. No.: WO2020/151380
PCT Pub. Date: Jul. 30, 2020

(65) Prior Publication Data
US 2021/0226673 A1 Jul. 22, 2021

(30) Foreign Application Priority Data

Jan. 22, 2019 (CN) .......................... 201910058663.1

(51) Int. Cl.
 *H04B 7/0413* (2017.01)
 *H04L 1/06* (2006.01)
(52) U.S. Cl.
 CPC ......... *H04B 7/0413* (2013.01); *H04L 1/0618* (2013.01)
(58) Field of Classification Search
 CPC ...... H04B 7/0413; H04B 7/06; H04B 7/0602; H04B 7/0697; H04L 1/0618; H04L 1/0625; H04L 1/0631
 See application file for complete search history.

(56) References Cited

U.S. PATENT DOCUMENTS

| 8,953,712 | B2* | 2/2015 | Kuo | ..................... H04B 7/0413 |
| | | | | 375/298 |
| 10,284,334 | B2* | 5/2019 | Khsiba | .................. H04L 1/0048 |

(Continued)

OTHER PUBLICATIONS

Z. Li, F. Wang, X. Cheng and B. Jiao, "A transmit antenna coding scheme for spatial modulation," 2014 IEEE/CIC International Conference on Communications in China (ICCC), 2014, pp. 298-302, doi: 10.1109/ICCChina.2014.7008290. (Year: 2014).*

*Primary Examiner* — Betsy Deppe
(74) *Attorney, Agent, or Firm* — Intellectual Valley Law, P.C.

(57) ABSTRACT

The present application discloses a method for operating a wireless communication system. The method includes receiving a series of input data bits in a current timeslot by a transmitter and encoding the input data bits with a cross-Gray coding scheme to obtain coded information bits. Additionally, the method includes mapping the coded information bits to obtain respective multiple transmission symbols $X_t$ for the current timeslot in a constellation diagram. Furthermore, the method includes converting the multiple transmission symbols $X_t$ to generate a space-time matrix $S_t$ of the current timeslot by incorporating spatial bits associated with (Continued)

orders of respective transmitting antennas based on a space-time matrix $S_{t-1}$ of a previous timeslot. Moreover, the method includes transmitting a respective one of elements in the space-time matrix $S_t$ using a respective one transmitting antenna activated in the transmitter.

20 Claims, 6 Drawing Sheets

(56) References Cited

U.S. PATENT DOCUMENTS

| | | | |
|---|---|---|---|
| 10,476,729 B2 * | 11/2019 | Ko | H04B 7/0602 |
| 2005/0063483 A1 * | 3/2005 | Wang | H04L 1/0618 |
| | | | 375/267 |

* cited by examiner

| Input Data Bit | Spatial Bit | Antenna Serial #1 | Antenna Serial #2 | Modulated Bit | Space-Time Matrix |
|---|---|---|---|---|---|
| 000 | 0 | 1 | 2 | 00 | $\begin{bmatrix} -1 & 0 \\ 0 & -1 \end{bmatrix}$ |
| 001 | 0 | 1 | 2 | 01 | $\begin{bmatrix} -1 & 0 \\ 0 & +1 \end{bmatrix}$ |
| 010 | 0 | 1 | 2 | 10 | $\begin{bmatrix} +1 & 0 \\ 0 & -1 \end{bmatrix}$ |
| 011 | 0 | 1 | 2 | 11 | $\begin{bmatrix} +1 & 0 \\ 0 & +1 \end{bmatrix}$ |
| 100 | 1 | 2 | 1 | 00 | $\begin{bmatrix} -1 & 0 \\ 0 & -1 \end{bmatrix}$ |
| 101 | 1 | 2 | 1 | 01 | $\begin{bmatrix} -1 & 0 \\ 0 & +1 \end{bmatrix}$ |
| 110 | 1 | 2 | 1 | 10 | $\begin{bmatrix} +1 & 0 \\ 0 & -1 \end{bmatrix}$ |
| 111 | 1 | 2 | 1 | 11 | $\begin{bmatrix} +1 & 0 \\ 0 & +1 \end{bmatrix}$ |

| Tx Info Bit | 000 | 001 | 010 | 011 | 100 | 101 | 110 | 111 |
| --- | --- | --- | --- | --- | --- | --- | --- | --- |
| Spatial Bit | 0 | 0 | 0 | 0 | 1 | 1 | 1 | 1 |
| DSM Modu Bit | 00 | 01 | 10 | 11 | 00 | 01 | 10 | 11 |

METHOD FOR WIRELESS DATA COMMUNICATION AND A COMMUNICATION APPARATUS

CROSS-REFERENCE TO RELATED APPLICATION

This application is a national stage application under 35 U.S.C. § 371 of International Application No. PCT/CN2019/123894 filed Dec. 9, 2019, which claims priority to Chinese Patent Application No. 201910058663.1, filed Jan. 22, 2019, the contents of which are incorporated by reference in the entirety.

TECHNICAL FIELD

The present invention relates to communication technology, more particularly, to a method for wireless data communication, and a communication apparatus.

BACKGROUND

Multiple-Input Multiple-Output (MIMO) technology has been widely applied with relative high diversity gain and multiplexing gain in wireless communication system in which multiple antennas are used at both the source (transmitter) and the destination (receiver). The antennas at each end of the communications circuit are combined to minimize errors and optimize data speed. However, channel-channel interference becomes more and more a serious problem, the reliability of data transmission gradually drops. Spatial modulation (SM) is introduced as a branch technology of MIMO to activate only one transmitting antenna during one timeslot, thus avoiding the channel-channel interference completely. Compared to traditional MIMO technology, SM technology adds space dimension. Therefore, spectrum efficiency of communication with SM technology is enhanced over traditional communication with MIMO technology. On the other hand, SM technology has its own limitation. In the SM system, receiver terminal requires to know the channel state information first, which makes channel estimation even more difficult. Especially for high-speed data flow through channels, the reliability associated with channel state information is even harder to be guaranteed. Improved communication technology is desired.

SUMMARY

In an aspect, the present disclosure provides a method for operating a wireless communication system for data communication. The method includes a step of receiving a series of input data bits in a current timeslot by a transmitter of the wireless communication system. The method further includes a step of encoding the input data bits with a cross-Gray coding scheme to obtain coded information bits. Additionally, the method includes a step of mapping the coded information bits to respectively obtain multiple transmission symbols $X_t$ for the current timeslot in a constellation diagram, including $\theta$ degree rotation within the constellation diagram. Furthermore, the method includes a step of converting the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot. Moreover, the method includes transmitting a respective one of elements in the space-time matrix $S_t$ using a respective one transmitting antenna being activated.

Optionally, the step of encoding the input data bits with the cross-Gray coding scheme includes receiving the input data bits including a series of bit-elements of $\{p_1, p_2, p_3, \ldots, p_{n-1}, p_n\}$. The step further includes inserting $p_n$ every other one bit-element in a sub-sequence of $\{p_1, p_2, p_3, \ldots, p_{n-1}\}$, either from left to right or from right to left of the input data bits to obtain the coded information bits.

Optionally, the step of mapping the coded information bits includes mapping the coded information bits to obtain multiple initial constellation symbols $X_t'$ of the current timeslot at multiple constellation nodes (i,j) in the constellation diagram, $X_t' = X_{ij}^R + X_{ij}^I$, wherein $X_{ij}^R$ is a real part of and $X_{ij}^I$ is an imaginary part of a respective one initial constellation symbol $X_{t\,(i,j)}'$ at a respective one of the multiple constellation nodes (i,j). The step further includes rotating the multiple initial constellation symbols $X_t'$ by $\theta$ degree rotation to obtain the multiple transmission symbols $X_t$ as $$X_t = \begin{bmatrix} \cos\theta & \sin\theta \\ -\sin\theta & \cos\theta \end{bmatrix} \begin{bmatrix} X_{ij}^R \\ X_{ij}^I \end{bmatrix}, \text{ where } 0° < \theta < 360°.$$

Optionally, the step of mapping the coded information bits includes modulating the coded information bits by Quadrature Amplitude Modulation (QAM) protocol, or Phase shift Keying (PSK) protocol, or Amplitude-Phase shift Keying (APSK) protocol to obtain modulated bits in terms of the multiple transmission symbols $X_t$.

Optionally, the step of converting the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot includes performing a convolution operation of the multiple transmission symbols $X_t$ for the current timeslot with the space-time matrix $S_{t-1}$ generated in the previous timeslot.

Optionally, the space-time matrix $S_t$ of the current timeslot includes a real matrix with one element per column denoting a to-be-transmitted information bit including a respective one of the modulated bits and a respective one of the spatial bits for activating a respective one transmitting antenna and only one to-be-transmitted information bit per row associated with only one transmitting antenna being activated once in the current timeslot.

Optionally, the step of performing a convolution operation includes estimating a channel transmission matrix $H_t$ of the current timeslot, $H_t = Y_{t-1}X_t - N_{t-1}X_t$, based on multiple reception symbols $Y_{t-1}$ received in the previous timeslot by a receiver of the wireless communication system, $Y_{t-1} = H_{t-1}S_{t-1} + N_{t-1}$, where $H_{t-1}$ is a channel transmission matrix of the previous timeslot and $N_{t-1}$ is a noise vector in the previous timeslot. Additionally, the step includes converting both the multiple transmission symbols $X_t$ and the channel transmission matrix $H_t$ from a complex field to a real field. Furthermore, the step includes performing an orthogonal triangulation decomposition to the channel transmission matrix $H_t$.

Optionally, the step of transmitting a respective one of elements in the space-time matrix $S_t$ includes activating a respective one transmitting antenna for transmitting a respective one to-be-transmitted information bit to a respective one receiving antenna based on an estimated channel transmission matrix.

In another aspect, the present disclosure provides a method for operating a wireless communication system for data communication. The method includes a step of transmitting a respective one of elements in a space-time matrix $S_t$ using an activated one of $n_t$ number of transmitting antennas of the wireless communication system through respective one of channels based on an additive white Gaussian noise (AWGN) model. The method further includes a step of receiving multiple reception symbols $Y_t$ respectively by $n_r$ number of receiving antennas of the wireless communication system, wherein $Y_t=H_tS_t+N_t$, $H_t$ is a channel transmission matrix at a current timeslot with a dimension of $(n_r \times n_t)$ and respective elements representing channel gains associated with respective $n_r$ number of receiving antennas and $n_t$ number of transmitting antennas. $H_t$ is estimated from multiple symbols $Y_{t-1}$ received during a previous timeslot by a receiver via $Y_{t-1}X_t$–$N_{t-1}X_t$, the space-time matrix $S_t$ is generated by the transmitter from multiple transmission symbols $X_t$ in a constellation diagram mapped from coded information bits for the current timeslot. $N_t$ is a transmission noise vector in the current timeslot based on the AWGN model. $N_{t-1}$ is a transmission noise vector in the previous timeslot. Furthermore, the method includes a step of demodulating the multiple reception symbols $Y_t$ to obtain demodulated information bits. Moreover, the method includes a step of decoding a respective one of the demodulated information bits to obtain a respective one decoded constellation symbol.

Optionally, the step of decoding a respective one of the demodulated information bits includes decoding by a sphere decoding detection algorithm to obtain corresponding spatial bits or demodulated data bits in decoded constellation symbols.

Optionally, the step of decoding includes using a receiver-centric sphere decoding detection algorithm to decode the demodulated information bits to obtain decoded constellation symbols independent from a channel transmission matrix of the current timeslot.

Optionally, the decoded constellation symbols are represented by $$[\hat{X}_{DSM}^{Rx\text{-}SD}]=\text{argmaxtrace}_{S\in X_t}\{\text{Re}(Y_t^H - Y_{t-1}X_t) \le C_R^2\},$$

where argmaxtrace{.} is to output an argmax value within a search radius $C_R$ for the current timeslot. $Y_t^H$ are conjugate transposition of multiple reception symbols $Y_t$ respectively received in the current timeslot by $n_r$ number of antennas in the receiver of the wireless communication system. $Y_{t-1}$ is reception symbols received in a previous timeslot.

Optionally, the method further includes a step of converting both the multiple transmission symbols $X_t$ in a transmitter of the wireless communication system and an estimated channel transmission matrix $H_t$ from a complex field to a real field. Additionally, the method includes a step of performing an orthogonal triangulation decomposition to the estimated channel transmission matrix $H_t$. The method further includes a step of converting the multiple transmission symbols $X_t$ to a space-time matrix $S_t$. Furthermore, the method includes a step of transmitting an information bit made by a respective one of elements in the space-time matrix $S_t$ using a respective activated transmitter antenna. Moreover, the method includes a step of decoding the multiple reception symbols $Y_t=H_tS_t+N_t$ received by the receiver based on a transmitter-centric sphere decoding detection algorithm to decode the demodulated information bits to obtain decoded constellation symbols.

Optionally, the decoded constellation symbols are represented by $$[\hat{X}_{DSM}^{Tx\text{-}SD}]=\text{argmin}_{\overline{X}\in O_c}\{\|\overline{Y}_t^Q - R\overline{X}_t\|^2 \le C_R^2\},$$

where argmin{.} is a function for obtaining a minimum value in a group $O_c$ of $\overline{X}$ within a search radius $C_R$ for the current timeslot. $\overline{Y}_t^Q$ represents multiple reception symbols $Y_t$ left-multiplying a positive definite matrix $Q$.

$$\overline{Y}_t = [\text{Re}(Y_t), \text{Im}(Y_t)]^T,$$

$$R = \begin{bmatrix} \text{Re}(Q^H \overline{Y_{t-1}}), & -\text{Im}(Q^H \overline{Y_{t-1}}) \\ \text{Re}(Q^H \overline{Y_{t-1}}), & \text{Im}(Q^H \overline{Y_{t-1}}) \end{bmatrix},$$

$$\overline{X}_t = [\text{Re}(\overline{X}_t^T), \text{Im}(\overline{X}_t^T)]^T,$$

$$Q^H \overline{Y_{t-1}} = QR$$

$$= \begin{cases} [Q_{1[2n_r\times 2n_t]} Q_{2[2n_r\times 2(n_r-n_t)]}] \begin{bmatrix} R_{1[2n_t\times 2n_t]} \\ 0_{[2(n_r-n_t)\times 2n_t]} \end{bmatrix} & n_r \ge n_t \\ Q_{1[2n_r\times 2n_r]} [R_{1[2n_r\times 2n_r]} \; R_{2[2n_r\times 2(n_t-n_r)]}] & n_r < n_t \end{cases},$$

where $Q^H$ is a conjugate transposition of matrix $Q$, $Q_1Q_2=Q$, $R_1R_2=R$. $n_r$ represents numbers of receiving antennas, and $n_t$ represent numbers of transmitting antennas.

Optionally, the step of decoding the multiple reception symbols $Y_t$ includes searching through a shortest searching path $\hat{T}$ among a group of searching paths $T_i$ in the constellation diagram to obtain the decoded constellation symbols. The shortest searching path is represented by $$\hat{T} = \arg\min_{T_i \in Tree}\{\|Q_1^H \overline{Y}_t - R \times T_i\|^2 \le C_Q^2 - \|Q_2^H \overline{Y}_t\|^2\}.$$

Optionally, the step of decoding a respective one of the demodulated information bits includes decoding the demodulated information bit of the current timeslot to obtain an output data bit containing a spatial bit and/or modulated bit, and storing the output data bit, if the spatial bit and/or modulated bit in a to-be-transmitted information bit of the current timeslot is different from a spatial bit and/or modulated bit in a to-be-transmitted information bit of a previous timeslot. The step further includes obtaining and storing an output data bit associated with the to-be-transmitted information bit of the previous timeslot to be the output data bit for the current timeslot, if the spatial bit and/or modulated bit in the to-be-transmitted information bit of the current timeslot is same as a spatial bit and/or modulated bit in the to-be-transmitted information bit of the previous timeslot.

In yet another aspect, the present disclosure provides a wireless communication apparatus. The wireless communication apparatus includes an encoder configured to encode input data bits of a current timeslot with a cross-Gray coding scheme to obtain coded information bits. The wireless communication apparatus further includes a modulator configured to map the coded information bits to respectively obtain multiple transmission symbols $X_t$ for the current timeslot in a constellation diagram, including θ degree rotation within the constellation diagram. Additionally, the wireless communication apparatus includes a processor configured to convert the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot. The wireless communication apparatus further includes a transmitter configured to activate a respective one of $n_t$ number of transmitting antennas to transmit a respective one of elements in the space-time matrix $S_t$. Furthermore, the wireless communication apparatus includes a receiver configured to have a respective one of $n_r$ number of receiving antennas to receive a respective one of multiple reception symbols $Y_t=H_tS_t+N_t$ based on channel gain defined by a channel transmission matrix $H_t$. The wireless communication apparatus further includes a demodulator configured to demodulate the multiple reception symbols $Y_t$ to obtain demodulated information bits. Moreover, the wireless communication apparatus includes a decoder configured to decode a respective one of the demodulated information bits to obtain a respective one decoded constellation symbol from which an output data bit can be extracted and stored.

Optionally, the modulator includes one selected from a Quadrature Amplitude Modulation (QAM) modulator, or a Phase shift Keying (PSK) modulator, or an Amplitude-Phase shift Keying (APSK) modulator to obtain modulated bits in terms of the multiple transmission symbols $X_t$. The processor is configured to perform a convolution operation of the multiple transmission symbols $X_t$ of the current timeslot with the space-time matrix $S_{t-1}$ of the previous timeslot to generate the space-time matrix $S_t$ of the current timeslot.

Optionally, the decoder includes a detector storing a receiver-centric sphere decoding detection algorithm executed to decode demodulated information bits to obtain decoded constellation symbols when the transmitter directly transmits the elements in the space-time matrix $S_t$ of the current timeslot without having the processor to perform extra digital-data operations to the multiple transmission symbols $X_t$.

Optionally, the decoder includes a detector storing a transmitter-centric sphere decoding detection algorithm executed to decode demodulated information bits to obtain decoded constellation symbols when the transmitter transmits to-be-transmitted information bits after the processor performs extra digital-data operations of these steps: estimating a channel transmission matrix $H_t$ of the current timeslot, $H_t=Y_{t-1}X_t-N_{t-1}X_t$, based on multiple reception symbols $Y_{t-1}$ received in the previous timeslot by a receiver of the wireless communication apparatus, $Y_{t-1}=H_{t-1}S_{t-1}+N_{t-1}$. $H_{t-1}$ is a channel transmission matrix of the previous timeslot and $N_{t-1}$ is a noise vector in the previous timeslot; converting both the multiple transmission symbols $X_t$ and the channel transmission matrix $H_t$ from a complex field to a real field; and performing an orthogonal triangulation decomposition to the channel transmission matrix $H_t$.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Accordingly, the present disclosure provides, inter alia, a wireless communication method, a communication apparatus utilizing differential spatial modulation (DSM) without need of channel transmission estimation, that possesses advantages with simplified system processing and enhanced system reliability for data transmission substantially to obviate one or more of the problems due to limitations of the related art. For example, the method of the present disclosure can be applied in an electronic price-tag updating system.

Figure 1:
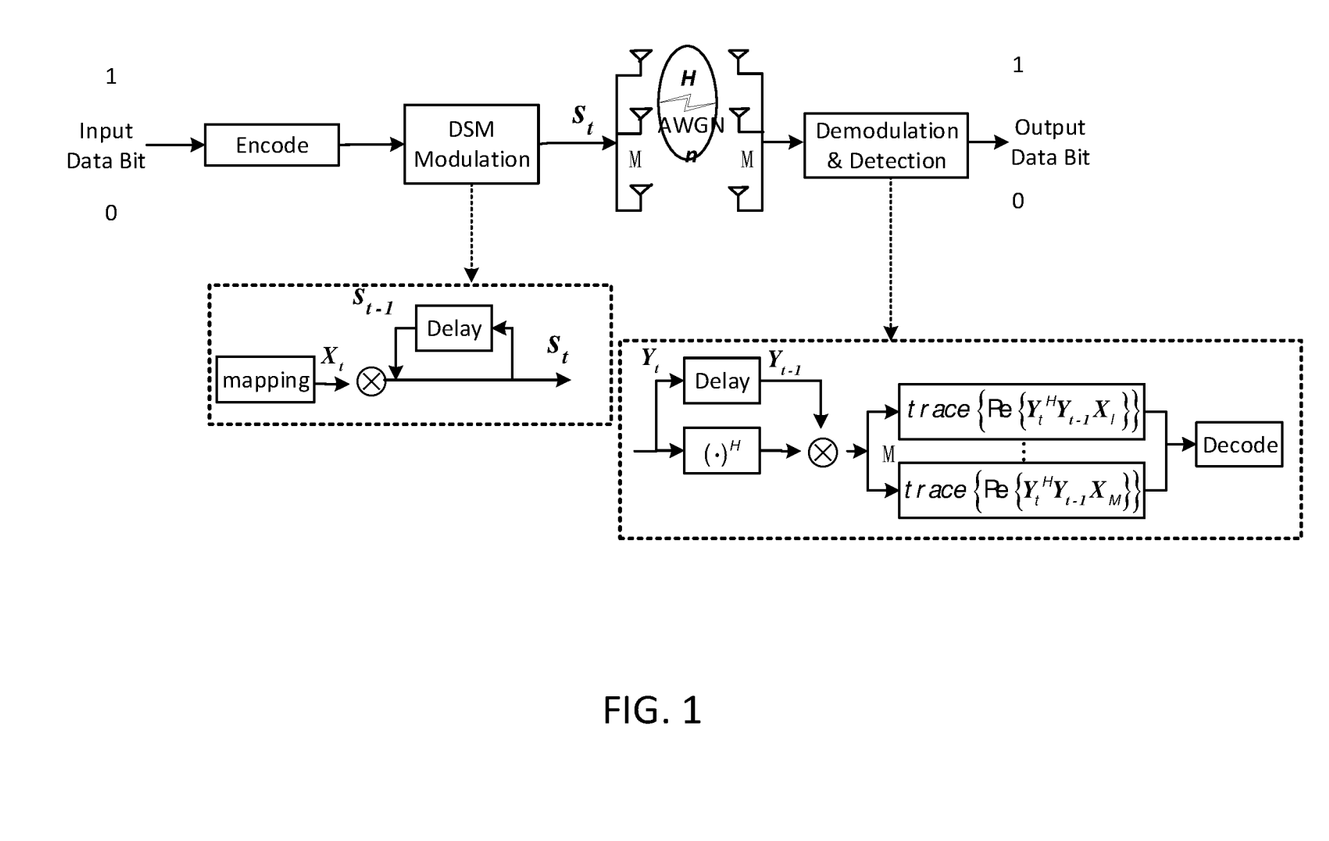
FIG. 1 is a schematic diagram of a wireless communication system according to some embodiments of the present disclosure.

In one aspect, a wireless communication method is provided. Optionally, the wireless communication method is implemented thorough a wireless communication system illustrated in FIG. 1 as an example. The method is shown by a flow chart shown in FIG. 2 based on the wireless communication system shown in FIG. 1. Referring to FIG. 1, the wireless communication system is configured to receive a series of input data bits that are subjected for wirelessly transmitting via a transmitter to a receiver in the communication system. Optionally, the series of input data bits include information generated in a server device which is associated with the transmitter configured to transmit the input data bits in terms of multiple transmission symbols that are processed before transmission via an activated one of multiple transmitting antennas. The data processing operation of the input data bits includes encoding the input data bits to coded bits via an encoder based on a certain encoding scheme and modulating the coded bits via a modulator according to a certain modulation scheme. Optionally, a differential spatial modulation scheme is used. Optionally, the wireless transmission is achieved through one of multiple channels controlled by a channel transmission matrix. For example, Multiple-Input Multiple-Output (MIMO) technology has been widely applied with relative high diversity gain and multiplexing gain in wireless communication system in which multiple antennas are used at both a transmitter and a receiver of the wireless communication system. The receiver is part of a user device configured to receive the multiple reception symbols wirelessly via at least one receiving antenna. The multiple reception symbols are related to the multiple transmission symbols processed through the channel transmission matrix plus certain channel noises. The multiple reception symbols are then demodulated by a demodulator to obtain demodulated information bits and decoded by a decoder/detector to generate decoded symbols, from which an output data bit can be deduced.

Optionally, the transmitter side and the receiver side of the wireless communication system can be switched in positions, i.e., the receiver can include multiple antennas configured to transmit signals and the transmitter also can include multiple antennas configured to receive the signals from the receiver.

Figure 2:
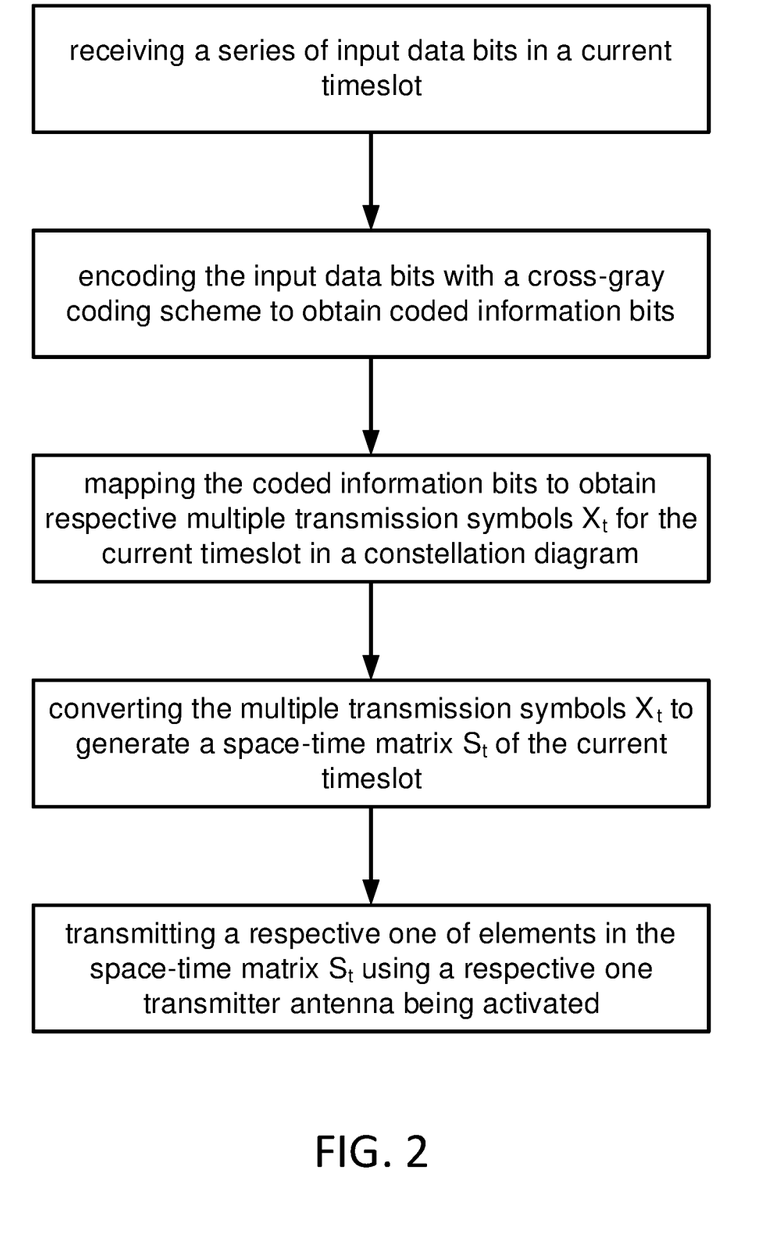
FIG. 2 is a flow chart of a wireless communication method according to an embodiment of the present disclosure.

Referring to FIG. 2, in the embodiment, the method includes receiving a series of input data bits in a current timeslot by a transmitter of the wireless communication system. The method further includes a step of encoding the input data bits with a cross-Gray coding scheme to obtain coded information bits. Optionally, the input data bits can be encoded via various encoding schemes. Optionally, the input data bits can be encoded using Gray encoding scheme. In the embodiment, the input data bits are encoded using Cross-Gray encoding scheme, enhancing encoding efficiency for subsequent differential spatial modulation operation. The cross-Gray encoding scheme can be achieved, for example, on an input bits sequence $\{p_1, p_2, p_3, \ldots, p_{n-1}, p_n\}$. The encoding is performed by inserting $p_n$ every other bit from left to right or from right to left of a bit sequence $\{p_1, p_2, p_3, \ldots, p_{n-1}\}$ to obtain coded bit sequence. In an example, the input data bits are formed by a sequence of binary digits 0 and 1. Any two neighboring digits in the coded bit sequence, only two are different. Inserting $p_n$ from left to right every other digit into a bit sequence $\{p_1, p_2, p_3, \ldots, p_{n-1}\}$ leads to a coded bit sequence $\{p_n, p_1, p_n, p_2, p_n, p_3, \ldots, p_n, p_{n-1}\}$. Inserting $p_n$ from right to left every other digit into a bit sequence $\{p_1, p_2, p_3, \ldots, p_{n-1}\}$ leads to another coded bit sequence $\{p_1, p_n p_2, p_n, p_3, \ldots, p_n, p_{n-1}, p_n\}$. Cross-Gray encoding scheme changes a length of the bit sequence with a simple encoding rule, enhancing encoding efficiency comparing to traditional gray encoding scheme. Correspondingly, a receiver of the wireless communication system can perform a decoding operation from left to right or from right to left according to a same manner.

Referring to FIG. 2, the method additionally includes a step of mapping the coded information bits to obtain respective multiple transmission symbols $X_t$ for the current timeslot in a constellation diagram. In the embodiment, the step of mapping the coded information bits to a constellation diagram includes performing a modulation operation to the coded information bits to obtain modulated bits in terms of multiple transmission symbols $X_t$ in the constellation diagram. Optionally, the modulation operation includes one selected from Quadrature Amplitude Modulation (QAM), Phase Shift Keying (SK) or Amplitude-Phase Shift Keying (APSK) modulation techniques. For example, the symbols are encoded in the difference in phase between successive sample information bits, this is called differential phase-shift keying (DPSK). A convenient method to represent PSK schemes is on a constellation diagram. This shows the points in the complex plane where, in this context, the real and imaginary axes are termed the in-phase and quadrature axes respectively due to their 90° separation. Such a representation on perpendicular axes lends itself to straightforward implementation. The amplitude of each point along the in-phase axis is used to modulate a cosine (or sine) wave and the amplitude along the quadrature axis to modulate a sine (or cosine) wave. For example, BPSK uses two phases which are separated by 180° and so can also be termed 2-PSK. For example, QPSK uses four points on the constellation diagram, equi-spaced around a circle. In the constellation diagram each symbol X is a complex number having a real portion $X^R$ and an imaginary portion $X^I$.

Optionally, if the cross-Gray coding scheme is used only on the transmitter of the wireless communication system, a higher error rate may be caused. For example, the transmitter transmits symbols (0+j) and (1+0j) (where j is the imaginary part symbol). After cross-Gray coding, two different symbols (1+j) and (0+0j) are obtained with corresponding real part symbol being crossed on the constellation diagram. In this case, it results in one of the transmitting antennas to transmit a symbol (0+0j), corresponding to 0 for both the real part and the imaginary part. Thus, the antenna has no corresponding transmission information to transmit, causing a large error in the encoding process. Additionally, after the transmission symbols are encoded via the cross-Gray coding scheme, the Euclidean distance of the transmission symbols also changes, causing reliability of the communication system to drop.

Accordingly, a rotation coordinates cross-Gray encoding scheme is adopted. In particular, after encoding to obtain the coded information bits, the mapping of the coded information bits to the constellation diagram leads to multiple initial constellation symbols $X_t'$ of the current timeslot at multiple constellation nodes with coordinates of (i, j). In this case, $X_t' = X_{ij}^R + X_{ij}^I$, wherein $X_{ij}^R$ is a real part of and $X_{ij}^I$ is an imaginary part of a respective one symbol $X_t'(i,j)$ at the node (i, j) in the constellation diagram. Then, a rotation operation is performed to rotate the multiple initial constellation symbols $X_t'$ by θ degrees to obtain the multiple transmission symbols $X_t$ as $$X_t = \begin{bmatrix} \cos\theta & \sin\theta \\ -\sin\theta & \cos\theta \end{bmatrix} \begin{bmatrix} X_{ij}^R \\ X_{ij}^I \end{bmatrix},$$

where 0°<θ<360° and is different per usage of different modulation scheme during the constellation mapping operation. Optionally, a simulation is performed and verified by experiment to select an optimum value of θ to determine final transmission symbol $X_t$ to reduce error-bit rate. In some embodiments, nPSK modulation scheme is employed to modulate coded information bits through the constellation mapping and rotation. A spectral efficiency at the transmitter can be given as $$m_{DSM} = \frac{1}{n_t}\log_2(n_t!) + n,$$

where $n_t$ is the number of transmitting antennas and n is the order of the nPSK modulation scheme.

Referring to FIG. 2, the method additionally includes a step of converting the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot. In the embodiment, the differential spatial modulation operation in the wireless communication system introduces a space-time field in which the transmission symbol X is converted to a space-time matrix S with dimensions of $n_t \times n_t$ with each element S(m, t) of the space-time matrix represents a transmission symbol being transmitted in time t within the timeslot by the m-th antenna of the $n_t$ transmitting antennas in the transmitter. Each element of the space-time matrix S becomes a to-be-transmitted symbol by the transmitter at a specific time using one activated transmitting antenna during the current timeslot. The method includes a step of transmitting a respective one of elements in the space-time matrix $S_t$ using a respective one transmitting antenna being activated.

For example, a space-time matrix $$S = \begin{bmatrix} S_{11} & 0 \\ 0 & S_{22} \end{bmatrix}$$

representing two transmission symbols $S_{11}$ and $S_{22}$ respectively transmitted y a 1-st and a 2-nd transmitting antenna during 1-st time and 2-nd time. Other elements being equal to 0 indicate that other transmitting antennas transmit no symbols. In an embodiment, the space-time matrix S is obtained by incorporating spatial bits information associated with orders of transmitting antennas being activated for transmission through wireless channels. The space-time matrix S must meet two following conditions: 1) every column of the space-time matrix S only has one element (effectively) so that every time it activates one transmitting antennas; 2) every row of the space-time matrix S has one element (effectively) so that one transmitting antenna must be activated only once for one time during the timeslot.

Figure 3:
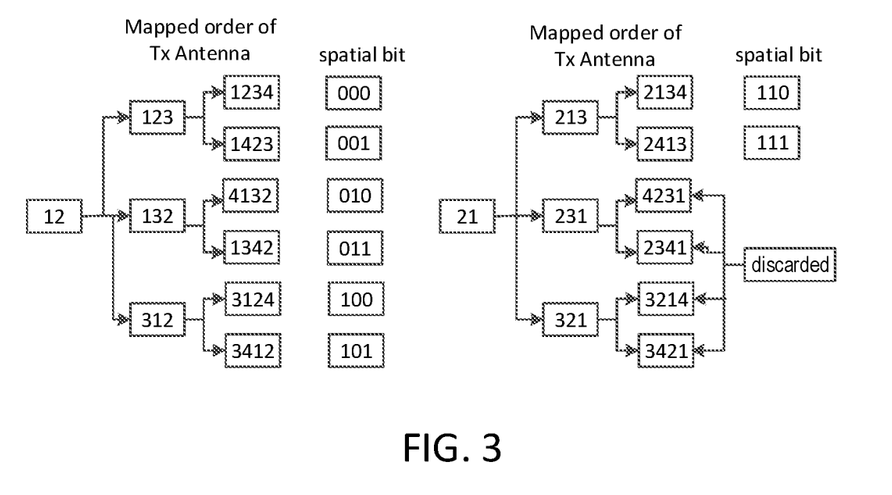
FIG. 3 is schematic diagram of encoded spatial bits corresponding to arrangements of transmitting antennas according to an embodiment of the present disclosure.

FIG. 3 is schematic diagram of encoded spatial bits corresponding to arrangements of transmitting antennas according to an embodiment of the present disclosure. The spatial bit information is represented respectively in real part and imaginary part of the transmission symbol corresponding to orders of the transmitting antennas in the transmitter. In a case that there are two transmitting antennas in the transmitter, the mapping order of the antennas is 1, 2 corresponds to a spatial bit of 0; the mapping order of the antennas is 2, 1 corresponds to another spatial bit of 1. Referring to FIG. 3, the number of transmitting antennas is $n_t$=4. In this case, spatial bits can adopt at least 8 codes to represent the four transmitting antennas. Extra 4 codes shown in FIG. 3 are discarded. Diversity gain is significantly enhanced.

Figure 4:
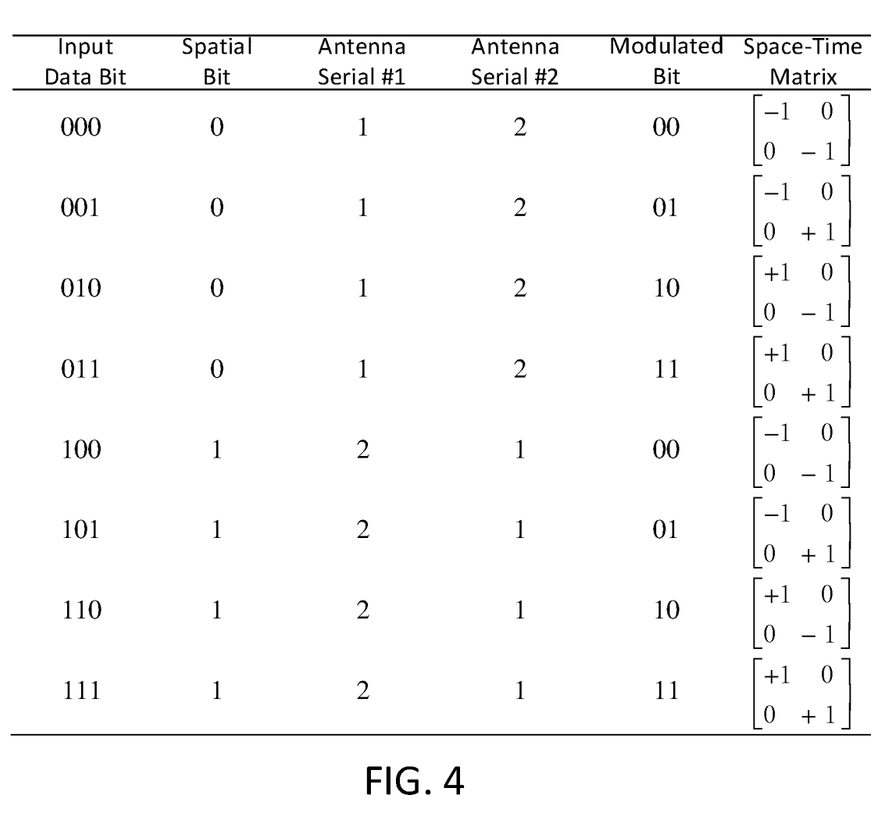
FIG. 4 is a table of using BPSK modulation in differential spatial modulation (DSM) mapping according to an embodiment of the present disclosure.

FIG. 4 is a table of using BPSK modulation in differential spatial modulation (DSM) mapping according to an embodiment of the present disclosure. The Input data bit may be encoded information bit after performing encoding operation via cross-Gray encoding scheme. Two transmitting antennas are involved, denoted by serial number #1 and #2, respectively. BPSK modulation scheme is employed in this case. When the antennas are activated in the order of serial number #1 and serial number #2, as shown in FIG. 4, the corresponding spatial bit would be 0. When the spatial bit is 0, and the to-be-transmitted space-time matrix is $$\begin{bmatrix} +1 & 0 \\ 0 & +1 \end{bmatrix},$$

the BPSK modulated bit is 11. Correspondingly, the transmitted information bit will be 011.

In an embodiment, the space-time matrix $S_t$ of a current timeslot is obtained by performing a convolution operation of the multiple transmission symbols $X_t$ for the current timeslot with the space-time matrix $S_{t-1}$ generated in the previous timeslot. Referring to FIG. 1, a channel model is needed to properly assess a multi-input multi-output channel for the wireless communication system containing $n_t$ number of transmitting antennas and $n_r$ number of receiving antennas, wherein $n_t$=$n_r$=M. Each receiving antenna receives not only the direct transmission symbol intended for it, but also receives a fraction of signal from other propagation paths. The channel response is expressed as a channel transmission matrix H with dimension of ($n_r \times n_t$). For example, a direct path formed between antenna 1 at the transmitter and the antenna 1 at the receiver is represented by the channel response as an element $h_{11}$. The channel response of the path formed between antenna 1 in the transmitter and antenna 2 in the receiver is expressed as another element $h_{21}$ and so on.

In the embodiment, a channel transmission matrix $H_t$ for the current timeslot needs to be estimated based on a $H_{t-1}$ for a previous timeslot, which is feedback from a receiver of the wireless communication system that is linked through channels between $n_r$ number of receiving antennas and $n_t$ number of transmitting antennas. Optionally, the channels are access points based on an additive white Gaussian noise (AWGN) model. The modulation operation of the coded information bits (mapped to multiple transmission symbols $X_t$ through the constellation mapping operation and coordinates rotation operation) at the transmitter can be performed without need of the channel transmission state of the current timeslot, thereby simplifying system processing on the transmission data and enhancing reliability of data transmission through the wireless communication system. Specifically, the step of modulating the coded information bits includes estimating a channel transmission matrix $H_t$ of the current timeslot, $H_t$=$Y_{t-1}X_t$-$N_{t-1}X_t$, based on multiple reception symbols $Y_{t-1}$ received in the previous timeslot by a receiver of the wireless communication system, $Y_{t-1}$=$H_{t-1}S_{t-1}$+$N_{t-1}$, where $H_{t-1}$ is a channel transmission matrix of the previous timeslot and $N_{t-1}$ is a noise vector in the previous timeslot. Referring to FIG. 2, the step of transmitting a respective one of elements in the space-time matrix $S_t$ includes activating a respective one transmitting antenna for transmitting the respective one to-be-transmitted information bit to a respective one receiving antenna based on the estimated channel transmission matrix.

Both the multiple transmission symbols $X_t$ and channel transmission matrix $H_t$ contain complex elements that describe both the amplitude and phase variations of the coded information bits and the channel link between the transmitter and the receiver of the wireless communication system. In a specific embodiment, the modulation operation at the transmitter side of the wireless communication system further includes converting both the multiple transmission symbols $X_t$ and the channel transmission matrix $H_t$ from a complex field to a real field and performing an orthogonal triangulation (QR) decomposition to the channel transmission matrix $H_t$ to obtain a QR-decomposed channel transmission matrix that is used for transmitting multiple transmission symbols during the current timeslot. The QR decomposition of the channel transmission matrix can be performed before or after it is converted from the complex field to the real field. When the above modulation operation to convert both the transmission symbols and channel transmission matrix from complex field to real field is performed at the transmitter side of the wireless communication system, the decoding complexity at the receiver side of the wireless communication system can be reduced.

Figure 5:
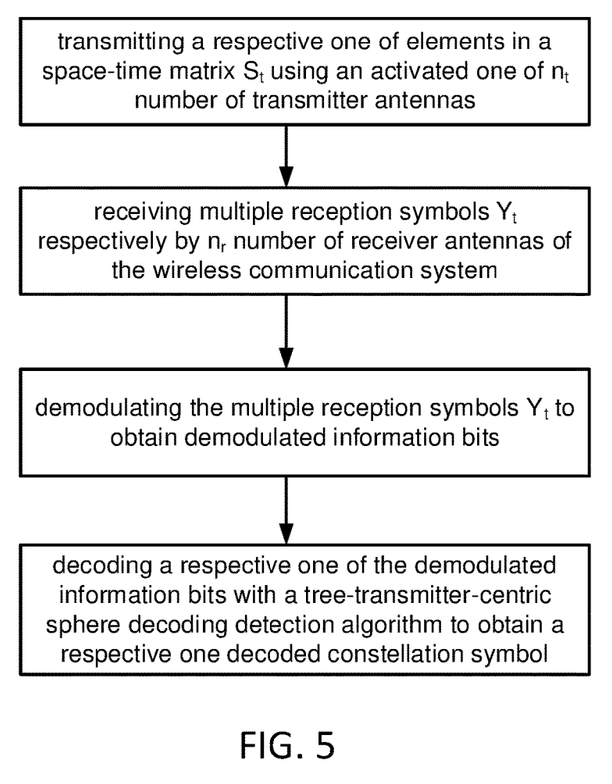
FIG. 5 is a flow chart of another wireless communication method according to an embodiment of the present disclosure.

FIG. 5 shows a flow chart of another wireless communication method according to an embodiment of the present disclosure. Referring to FIG. 1 and FIG. 5, the wireless communication method includes transmitting a respective one of elements in a space-time matrix $S_t$ using an activated one of $n_t$ number of transmitting antennas of the wireless communication system through respective one of channels based on an additive white Gaussian noise (AWGN) model. $X_1$ represents a first transmission symbol in the constellation diagram. $X_M$ represents a M-th transmission symbol in the constellation diagram. In an example, $1 \leq M \leq n_r$. $n_r$ is the number of receiving antennas in the receiver of the wireless communication system. The method further includes a step of receiving multiple reception symbols $Y_t$ respectively by $n_r$ number of receiving antennas of the wireless communication system, where $Y_t = H_t S_t + N_t$. $H_t$ is a channel transmission matrix at a current timeslot and is estimated from multiple symbols $Y_{t-1}$ received during a previous timeslot by the receiver via a relationship of $Y_{t-1} X_t = N_{t-1} X_t$. $N_t$ is a transmission noise vector in the current timeslot based on the AWGN model. $N_{t-1}$ is a transmission noise vector in the previous timeslot.

Referring to FIG. 5, the method further includes a step of demodulating the multiple reception symbols $Y_t$ to obtain demodulated information bits. In the embodiment, the receiver of the wireless communication system does not need information of wireless channel state information through estimation of the channel transmission matrix of the current timeslot. Instead, the demodulation can be performed based on channel transmission matrix obtained for the previous timeslot.

Additionally, referring to FIG. 5, the method includes another step of decoding a respective one of the demodulated information bits to obtain a respective one decoded constellation symbol. Optionally, the wireless communication system can adopt various different decoding algorithms to decode the demodulated information bits. For example, maximum likelihood detection (ML) algorithm is used. In another example, sphere decoding detection (SD) algorithm is used. The ML algorithm is to perform a complete searching through all grids in the constellation diagram to detect the transmission symbols. Its computational complexity grows exponentially with the increase in the number of transmitting antennas. The sphere decoding detection (SD) algorithm is applied to limit a range of searching space under a foundation of the ML algorithm by limiting numbers of grids to be searched.

In a preferred embodiment, an improved sphere decoding detection (SD) algorithm is provided to reduce calculation complexity in the detection process. In particular, each constellation grid is calculated through multiple layers within a sphere with a given radius and the search of transmission symbols is performed from bottom up in the sphere. When a layer associated with a grid currently being searched is beyond the radius of the sphere, the grid is then discarded. Instead, simply searching for the symbol on a grid with minimum Euclidean distance as the symbol for decoding.

In the embodiment, decoding scheme for a respective one of the demodulated information bits includes a decoding operation performed via a sphere decoding detection algorithm to obtain corresponding spatial bits or demodulated data bits in the decoded constellation symbols.

In the embodiment, the decoding scheme includes a receiver-centric sphere decoding detection algorithm configured to decode the demodulated information bits to obtain decoded constellation symbols independent from a channel transmission matrix of the current timeslot.

In a specific embodiment, the decoded constellation symbols $\hat{X}_{DSM}^{Rx-SD}$ obtained by using the receiver-centric sphere decoding detection algorithm are represented by $$[\hat{X}_{DSM}^{Rx-SD}] = \underset{X_t = X_{R,t} + j X_{I,t}}{\operatorname{argmin}} \{\|Y_t - Y_{t-1} X_t\|^2 \leq C_R^2\}$$

$$= \underset{X_t = X_{R,t} + j X_{I,t}}{\operatorname{argmax trace}} \{(Y_t - Y_{t-1} X_t)^H (Y_t - Y_{t-1} X_t) \leq C_R^2\}_t$$

$$= \underset{S \in X_t}{\operatorname{argmax trace}} \{\operatorname{Re}(Y_t^H - Y_{t-1} X_t) \leq C_R^2\},$$

where argmaxtrace{.} is to output an argmax value within a search radius $C_R$ for the current timeslot, $Y_t^H$ are conjugate transposition of multiple reception symbols $Y_t$ respectively received during current timeslot by $n_r$ number of antennas in the receiver of the wireless communication system based on transmission symbol $X_t$ transmitted during the current timeslot. $Y_{t-1}$ is reception symbols received in a previous timeslot. $\operatorname{maxRe}(Y_t^H - Y_{t-1} X_t) = \operatorname{min}(Y_t - Y_{t-1} X_t)^H (Y_t - Y_{t-1} X_t)$.

As shown above, based on the receiver-centric sphere decoding detection algorithm the receiver side of the wireless communication system can demodulate and decode the transmitted information bits to obtain decoded symbol without need to know information about the wireless channel transmission state information.

In another specific embodiment, the decoding scheme includes a transmitter-centric sphere decoding detection algorithm configured to decode the demodulated information bits to obtain decoded constellation symbols. Before performing the decoding operation, two following steps are executed at the transmitter side of the wireless communication system: 1) a step includes converting both the multiple transmission symbols $X_t$ and an estimated channel transmission matrix $H_t$ from a complex field to a real field; 2) and a second step includes performing an orthogonal triangulation decomposition to the estimated channel transmission matrix $H_t$. Based on the QR decomposition analysis on the estimated channel transmission matrix and upper-triangular characteristics of R matrix, the constellation grids at upper layer are made to be sequentially dependent to grids in lower layers. This reduces number of elements in the channel transmission matrix and reduces calculation complexity. Then, the transmitter side further execute steps of converting the multiple transmission symbols $X_t$ to a space-time matrix $S_t$ and transmitting an information bit made by a respective one of elements in the space-time matrix $S_t$ using a respective activated transmitter antenna. After the receiver receives the information bits in terms of multiple reception symbols $Y_t = H_t S_t + N_t$ based on which demodulated information bits are obtained, the transmitter-centric sphere decoding detection algorithm is executed to decode the demodulated information bits to obtain decoded constellation symbols.

In the specific embodiment, the decoded constellation symbols $\hat{X}_{DSM}^{Tx-SD}$ obtained by using the transmitter-centric sphere decoding detection algorithm are represented by $$[\hat{X}_{DSM}^{Tx-SD}] = \underset{X_t = X_{R,t} + j X_{I,t}}{\operatorname{argmin}} \{\|Q^H \overline{Y}_t - Q^H \overline{Y_{t-1} X_t}\|^2 \leq C_Q^2\}$$

$$= \underset{\overline{X} \in O_c}{\operatorname{argmin}} \{\|\overline{Y}_t^Q - R \overline{X}_t\|^2 \leq C_Q^2\}$$

$$= \overline{X},$$

wherein argmin{.} is a function for obtaining a minimum value in a group $O_c$ of $\overline{X}$ within a search radius $C_Q$ for the current timeslot, $\overline{Y}_t^Q$ represents multiple reception symbols $Y_t$ left-multiplying a positive definite matrix Q, $$\overline{Y}_t = [\text{Re}(Y_t), \text{Im}(Y_t)]^T,$$

$$R = \begin{bmatrix} \text{Re}(Q^H \overline{Y_{t-1}}), & -\text{Im}(Q^H \overline{Y_{t-1}}) \\ \text{Re}(Q^H \overline{Y_{t-1}}), & \text{Im}(Q^H \overline{Y_{t-1}}) \end{bmatrix},$$

$$\overline{X}_t = [\text{Re}(\overline{X}_t^T), \text{Im}(\overline{X}_t^T)]^T;$$

Here Re(.) represent real part of the matrix and Im(.) represents imaginary pan of the matrix. Under the transmitter-centric sphere decoding detection algorithm, every layer is updated with an updated searching radius $C_Q$. After the conversion to real field, $\overline{Y}_t$ is changed to a real matrix with a dimension of $2n_r \times 2n_t$. R is changed to a real matrix with a dimension of $2n_r \times 2n_t$. $\overline{X}_t$ is changed to a real matrix with a dimension of $2n_t \times 1$. Even though the dimensions of the channel transmission matrix have increased, but calculation volume during the process of decoding the demodulated information still becomes lighter since both the transmission and reception symbols are all represented by real matrices. And this transformation does not change the system transmission reliability or affect error-bit rate.

In the embodiment, the estimated channel transmission matrix is subjected a QR decomposition analysis for two conditions:

$$Q^H \overline{Y_{t-1}} = QR$$
$$= \begin{cases} [Q_{1[2n_r \times 2n_t]} Q_{2[2n_r \times 2(n_r-n_t)]}] \begin{bmatrix} R_{1[2n_t \times 2n_t]} \\ 0_{[2(n_r-n_t) \times 2n_t]} \end{bmatrix} & n_r \geq n_t \\ Q_{1[2n_r \times 2n_r]} \; [R_{1[2n_r \times 2n_r]} \; R_{2[2n_r \times 2(n_t-n_r)]}] & n_r < n_t \end{cases},$$

where $Q^H$ is a conjugate transposition of matrix Q, $Q_1 Q_2 = Q$, $R_1 R_2 = R$; $n_r$ represents numbers of receiving antennas, and $n_t$ represent numbers of transmitting antennas. Under the condition of $n_r < n_t$, matrix $Q_2$ is a null matrix so that it is not shown in above formula. Thus, $Q = Q_1$.

Figure 6:
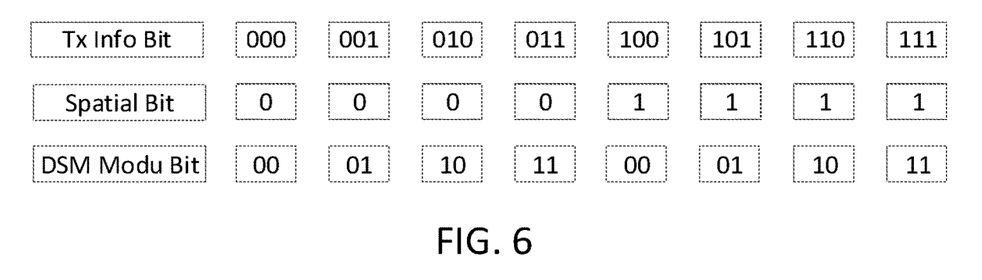
FIG. 6 is a schematic diagram of bit information under a DSM modulation scheme according to an embodiment of the present disclosure.

In an example for a case with two transmitting antennas ($n_t = 2$), a search scheme for every layer is shown in FIG. 6 in a differential spatial modulation system adopting, e.g., a BPSK modulation scheme. For the transmitted information bit 000 and 001, the spatial bit is the same during the search process. For the transmitted information bit 000 and 100, the modulated bit is the same. In the decoding operation of using either receiver-centric sphere decoding detection algorithm or transmitter-centric sphere decoding detection algorithm, three searches are conducted, yet two of them are repeated searches.

In another specific embodiment, a "tree"-branching search scheme is introduced to be associated with the decoding operation employing the transmitter-centric sphere decoding algorithm to further reduce number of searches and calculation complexity. Optionally, decoding a respective one of the demodulated information bits includes decoding the demodulated information bit of the current timeslot to obtain an output data bit containing a spatial bit and/or modulated bit, and storing the output data bit, if the spatial bit and/or modulated bit in a to-be-transmitted information bit of the current timeslot is different from a spatial bit and/or modulated bit in a to-be-transmitted information bit of a previous timeslot. Optionally, decoding a respective one of the demodulated information bits includes obtaining and storing an output data bit associated with the to-be-transmitted information bit of the previous timeslot to be the output data bit for the current timeslot, if the spatial bit and/or modulated bit in the to-be-transmitted information bit of the current timeslot is same as a spatial bit and/or modulated bit in the to-be-transmitted information bit of the previous timeslot.

Figure 7:
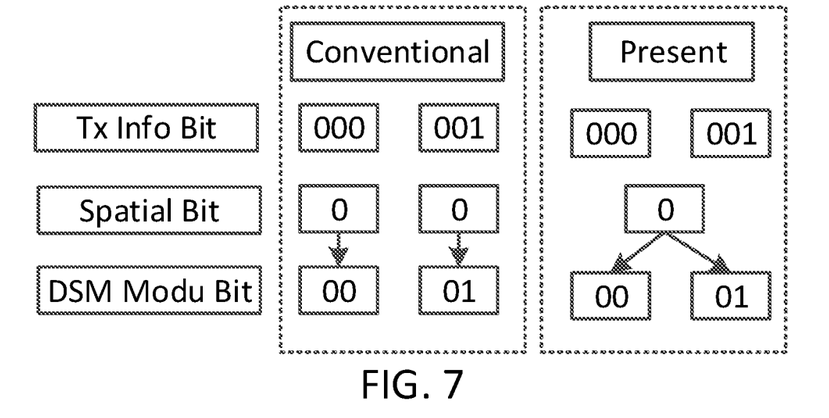
FIG. 7 is a schematic diagram of comparing a searching process using a conventional sphere decoding detection algorithm versus an improved sphere decoding detection algorithm according to an embodiment of the present disclosure.
Figure 8:
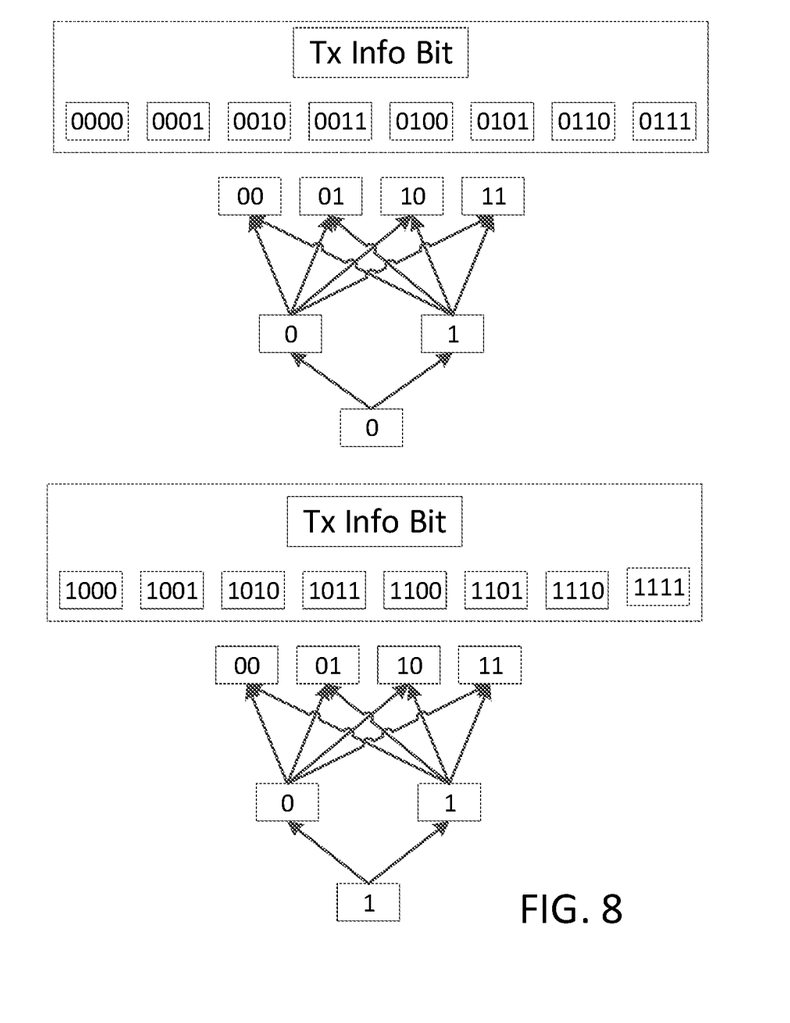
FIG. 8 is a schematic diagram of a searching process using an improved sphere decoding detection algorithm according to an embodiment of the present disclosure.

For example, in a case there are four transmitting antennas ($n_t = 4$), a searching process using a conventional sphere decoding detection algorithm versus an improved tree-branching sphere decoding detection algorithm is shown in FIG. 7 and FIG. 8 in a differential spatial modulation system adopting BPSK modulation scheme. Accordingly, by using the tree-branching transmitter-centric sphere decoding detection algorithm the number of calculations is substantially reduced. For searching a grid under conventional sphere decoding detection algorithm, total number of calculations is 16−3=48. While for searching a grid under the tree-branching transmitter-centric sphere decoding detection algorithm, total number of calculations becomes (2+4×2)×2=20, being reduced by more than half of original number.

In an embodiment under the tree-branching transmitter-centric sphere decoding detection algorithm, a shortest searching path for searching a grid is defined as a minimum Euclidean distance from the grid to a reception symbol $\overline{Y}_t$ after conducting a mapping operation to the elements at grids of each layer through a upper-triangular matrix R. The shortest searching path is represented by $$\hat{T} = \arg\min_{T_i \in Tree} \left\| \begin{bmatrix} Q_1^H \\ Q_2^H \end{bmatrix} \overline{Y}_t - \begin{bmatrix} R_1 \\ 0 \end{bmatrix} \times T_i \right\|^2$$

$$\hat{T} = \arg\min_{T_i \in Tree} \{ \| Q_1^H \overline{Y}_t - R \times T_i \|^2 \leq C_Q^2 - \| Q_2^H \overline{Y}_t \|^2 \}$$

where Tree is a group of all searching paths associated with the tree-branching search scheme. By implementing this algorithm for decoding detection, the complexity of calculations is reduced to more than half amount while without affecting reliability of the system. During the decoding detection, the decoding time is substantially reduced and hardware performance requirement by the system can be also relaxed.

Figure 9:
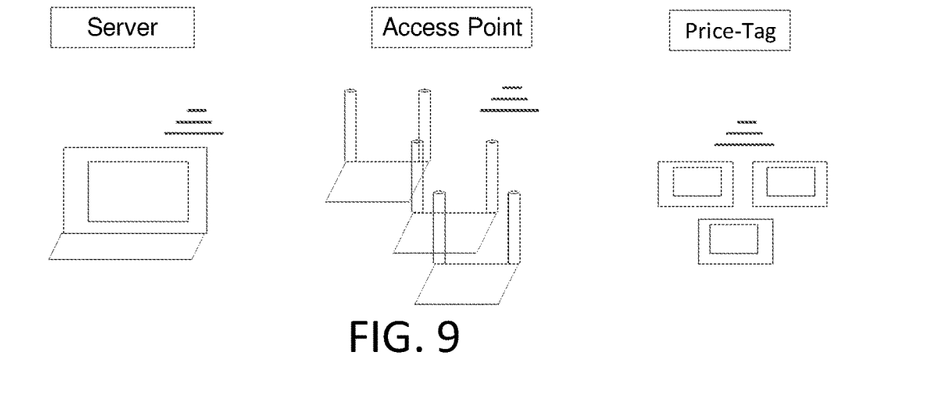
FIG. 9 is a schematic diagram of an electronic price-tag communication system according to an embodiment of the present disclosure.

In an alternative aspect, the wireless communication method of the present disclosure can be applicated to different kinds of communication systems. In an example, the wireless communication system utilizing the method of the present disclosure is an electronic price-tag communication system. FIG. 9 shows a schematic diagram of an electronic price-tag communication system. Referring to FIG. 9, a price-tag terminal serves as a transmitter to transmit information of price-tag back to a server. Alternatively, the price-tag terminal also can serve as a receiver to receive information from the server. Both the transmitter and the receiver are linked through wireless access point (AP) terminal for information communication. In some embodiments, differential spatial modulation and cross-Gray encoding scheme are incorporated with constellation symbols with mapping coordinate rotation technique to encode the information bits to obtain to-be-transmitted symbols for transmission from either the server or the price-tag terminal. Optionally, the AP terminal adopting Rayleigh flat fading channels with an estimated channel transmission matrix for transmitting the to-be-transmitted symbols, demodulating the reception symbols, and decoding the demodulated information bits to obtain the originally-modulated bits (plus spatial bits). In some embodiments, the method as disclosed in the present disclosure can effectively enhance diversity gain of the electronic price-tag communication system and secure reliability of data transmission through the communication system.

Figure 10:
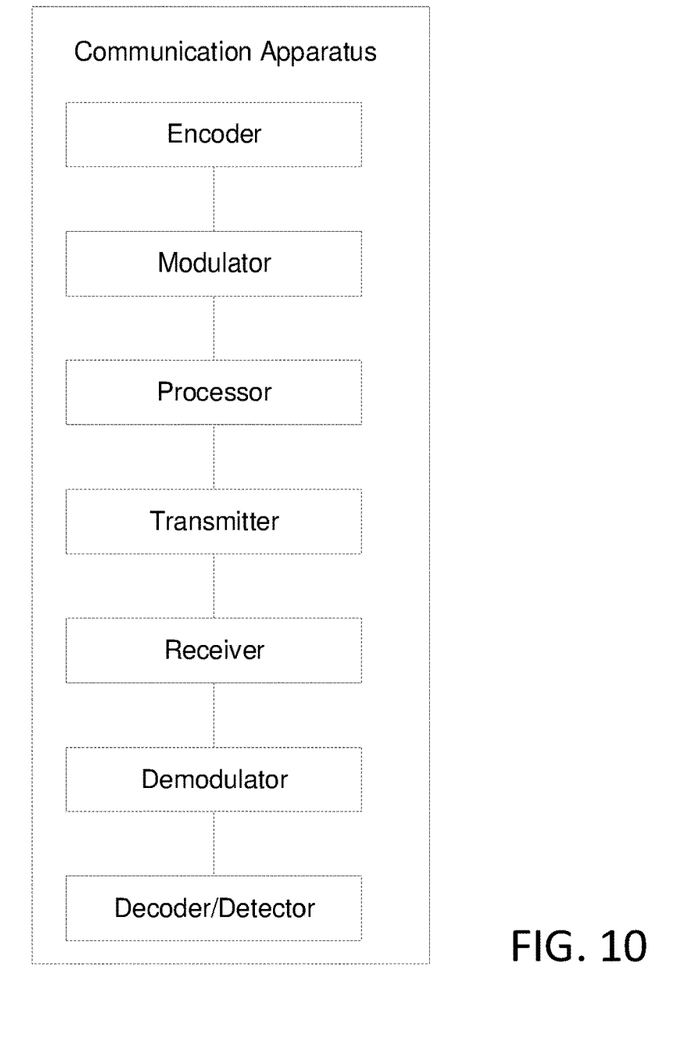
FIG. 10 is a block diagram of a communication apparatus according to an embodiment of the present disclosure.

In another aspect, the present disclosure provides a wireless communication apparatus. FIG. 10 is a block diagram of a wireless communication apparatus according to an embodiment of the present disclosure. Referring to FIG. 10, the wireless communication apparatus includes an encoder configured to encode the input data bits of a current timeslot with a cross-Gray coding scheme to obtain coded information bits. The wireless communication apparatus further includes a modulator configured to map the coded information bits to obtain respective multiple transmission symbols $X_t$ for the current timeslot in a constellation diagram. The mapping operation includes a rotation operation of an initial constellation symbol $X'_t$ by $\theta$ degree within the constellation diagram. Additionally, the wireless communication apparatus includes a processor configured to convert the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot. The wireless communication apparatus also includes a transmitter configured to activate a respective one of $n_t$ number of transmitting antennas to transmit a respective one of elements in the space-time matrix $S_t$. Furthermore, the wireless communication apparatus includes a receiver configured to have a respective one of $n_r$ number of receiving antennas to receive respective one of multiple reception symbols $Y_t=H_tS_t+N_t$ based on channel gain defined by a channel transmission matrix $H_t$. The wireless communication apparatus still includes a demodulator configured to demodulate the multiple reception symbols $Y_t$ to obtain demodulated information bits. Moreover, the wireless communication apparatus includes a decoder configured to decode a respective one of the demodulated information bits to obtain a respective one decoded constellation symbol from which an output data bit can be extracted and stored or transmitted.

Optionally, the modulator of the wireless communication apparatus includes one of following modulators selected from a Quadrature Amplitude Modulation (QAM) modulator, or a Phase shift Keying (PSK) modulator, or an Amplitude-Phase shift Keying (APSK) modulator to obtain modulated bits in terms of the multiple transmission symbols $X_t$. The processor of the wireless communication apparatus is configured to perform a convolution operation of the multiple transmission symbols $X_t$ of the current timeslot with the space-time matrix $S_{t-1}$ of the precious timeslot to generate the space-time matrix $S_t$ of the current timeslot. Optionally, the processor includes a memory configured to store a computer-executable program designed to execute multiple steps of the method of operating the wireless communication system and store any coded information bits, perform data-processing operation and mapping constellation symbols. Optionally, the encoder, the modulator, and the processor are integrated with the transmitter to form a transmission terminal. Optionally, the transmission terminal is a server. Optionally, the transmission terminal is a user device or a field-deployed device.

Optionally, the decoder of the wireless communication apparatus includes a detector storing a receiver-centric sphere decoding detection algorithm executed to decode demodulated information bits to obtain decoded constellation symbols when the transmitter directly transmits the elements in the space-time matrix $S_t$ of the current timeslot without having the processor to perform extra digital-data operations to the multiple transmission symbols $X_t$.

Optionally, the decoder of the wireless communication apparatus includes a detector storing a transmitter-centric sphere decoding detection algorithm executed to decode demodulated information bits to obtain decoded constellation symbols when the transmitter transmits to-be-transmitted information bits after the processor performs extra digital-data operations. Optionally, the detector includes a memory configured to store a computer-executable program which includes the sphere decoding detection algorithm and store any decoded information bits or symbols. The extra operations are performed at the transmitter terminal, including 1) estimating a channel transmission matrix $H_t$ of the current timeslot, $H_t=Y_{t-1}X_t-N_{t-1}X_t$, based on multiple reception symbols $Y_{t-1}$ received in the previous timeslot by a receiver of the wireless communication system, $Y_{t-1}=H_{t-1}S_{t-1}+N_{t-1}$, where $H_{t-1}$ is a channel transmission matrix of the previous timeslot and $N_{t-1}$ is a noise vector in the previous timeslot; 2) converting both the multiple transmission symbols $X_t$ and the channel transmission matrix $H_t$ from a complex field to a real field; and 3) performing an orthogonal triangulation decomposition to the channel transmission matrix $H_t$.

Optionally, the demodulator and the decoder are integrated within the receiver to form a receiving terminal. Optionally, the receiving terminal is a field deployed device. Optionally, the receiving terminal is a price-tag device. Optionally, the receiving terminal is also configured to transmit signal/data back to the transmission terminal or server. Optionally, the transmission between the transmission terminal and the receiving terminal is achieved through wireless channels acted as access points.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method for operating a wireless communication system for data communication comprising:
   receiving a series of input data bits in a current timeslot by a transmitter of the wireless communication system;
   encoding the input data bits with a cross-Gray coding scheme to obtain coded information bits;
   mapping the coded information bits to respectively obtain multiple transmission symbols $X_t$ for the current timeslot in a constellation diagram;
   converting the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot; and
   transmitting a respective one of elements in the space-time matrix $S_t$ using a respective one transmitting antenna being activated.

2. The method of claim 1, wherein encoding the input data bits with the cross-Gray coding scheme comprises:
   receiving the input data bits including a series of bit-elements of $\{p_1, p_2, p_3, \ldots, p_{n-1}, p_n\}$;
   inserting $p_n$ every other one bit-element in a sub-sequence of $\{p_1, p_2, p_3, \ldots, p_{n-1}\}$ either from left to right or from right to left of the input data bits to obtain the coded information bits.

3. The method of claim 1, wherein mapping the coded information bits comprises:
   mapping the coded information bits to obtain multiple initial constellation symbols $X_t'$ of the current timeslot at multiple constellation nodes (i, j) in the constellation diagram, $X_t' = X_{ij}^R + X_{ij}^I$, wherein $X_{ij}^R$ is a real part of and $X_{ij}^I$ is an imaginary part of a respective one initial constellation symbol $X_{t(i,j)}'$ at a respective one of the multiple constellation nodes (i, j);
   rotating the multiple initial constellation symbols $X_t'$ by $\theta$ degrees rotation to obtain the multiple transmission symbols $X_t$ as $$X_t = \begin{bmatrix} \cos\theta & \sin\theta \\ -\sin\theta & \cos\theta \end{bmatrix} \begin{bmatrix} X_{ij}^R \\ X_{ij}^I \end{bmatrix}, \text{ where } 0° < \theta < 360°.$$

4. The method of claim 3, wherein mapping the coded information bits comprises modulating the coded information bits by Quadrature Amplitude Modulation (QAM) protocol, or Phase shift Keying (PSK) protocol, or Amplitude-Phase shift Keying (APSK) protocol to obtain modulated bits in terms of the multiple transmission symbols $X_t$.

5. The method of claim 4, wherein converting the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot comprises performing a convolution operation of the multiple transmission symbols $X_t$ for the current timeslot with the space-time matrix $S_{t-1}$ generated in the previous timeslot.

6. The method of claim 5, wherein the space-time matrix $S_t$ of the current timeslot comprises a real matrix with one element per column denoting a to-be-transmitted information bit including a respective one of the modulated bits and a respective one of the spatial bits for activating a respective one transmitting antenna and only one to-be-transmitted information bit per row associated with only one transmitting antenna being activated once in the current timeslot.

7. The method of claim 5, wherein performing a convolution operation comprises:
   estimating a channel transmission matrix $H_t$ of the current timeslot, $H_t = Y_{t-1} X_t - N_{t-1} X_t$, based on multiple reception symbols $Y_{t-1}$ received in the previous timeslot by a receiver of the wireless communication system, $Y_{t-1} = H_{t-1} S_{t-1} + N_{t-1}$, where $H_{t-1}$ is a channel transmission matrix of the previous timeslot and $N_{t-1}$ is a noise vector in the previous timeslot;
   converting both the multiple transmission symbols $X_t$ and the channel transmission matrix $H_t$ from a complex field to a real field; and
   performing an orthogonal triangulation decomposition to the channel transmission matrix $H_t$.

8. The method of claim 7, wherein transmitting a respective one of elements in the space-time matrix $S_t$ comprises activating a respective one transmitting antenna for transmitting a respective one to-be-transmitted information bit to a respective one receiving antenna based on an estimated channel transmission matrix.

9. A method for operating a wireless communication system for data communication comprising:
   transmitting a respective one of elements in a space-time matrix $S_t$ using an activated one of $n_t$ number of transmitting antennas of the wireless communication system through respective one of channels based on an additive white Gaussian noise (AWGN) model;
   receiving multiple reception symbols $Y_t$ respectively by $n_r$ number of receiving antennas of the wireless communication system, wherein $Y_t = H_t S_t + N_t$, $H_t$ is a channel transmission matrix at a current timeslot with a dimension of $(n_r \times n_t)$ and respective elements representing channel gains associated with respective $n_r$ number of receiving antennas and $n_t$ number of transmitting antennas and $H_t$ is estimated from multiple symbols $Y_{t-1}$ received during a previous timeslot by a receiver via $Y_{t-1} X_t - N_{t-1} X_t$, the space-time matrix $S_t$ is generated by the transmitter from multiple transmission symbols $X_t$ in a constellation diagram mapped from coded information bits for the current timeslot, $N_t$ is a transmission noise vector in the current timeslot based on the AWGN model, $N_{t-1}$ is a transmission noise vector in the previous timeslot;
   demodulating the multiple reception symbols $Y_t$ to obtain demodulated information bits; and
   decoding a respective one of the demodulated information bits to obtain a respective one decoded constellation symbol.

10. The method of claim 9, wherein decoding a respective one of the demodulated information bits comprises decoding by a sphere decoding detection algorithm to obtain corresponding spatial bits or demodulated data bits in decoded constellation symbols.

11. The method of claim 10, wherein the sphere decoding detection algorithm is a receiver-centric sphere decoding detection algorithm; and
   decoding by the sphere decoding detection algorithm comprises decoding by the receiver-centric sphere decoding detection algorithm to decode the demodulated information bits to obtain the decoded constellation symbols independent from a channel transmission matrix of the current timeslot.

12. The method of claim 11, wherein the decoded constellation symbols are represented by $$[\hat{X}_{DSM}^{Rx\text{-}SD}] = \text{argmaxtrace}_{S \in X_t} \{\text{Re}(Y_t^H - Y_{t-1} X_t) \leq C_R^2\},$$

wherein argmaxtrace{.} is to output an argmax value within a search radius $C_R$ for the current timeslot, $Y_t^H$ are conjugate transposition of multiple reception symbols $Y_t$ respectively received in the current timeslot by $n_r$ number of antennas in the receiver of the wireless communication system, $Y_{t-1}$ is reception symbols received in a previous timeslot.

13. The method of claim 10, further comprising:
converting both the multiple transmission symbols $X_t$ in a transmitter of the wireless communication system and an estimated channel transmission matrix $H_t$ from a complex field to a real field;
performing an orthogonal triangulation decomposition to the estimated channel transmission matrix $H_t$; and
converting the multiple transmission symbols $X_t$ to a space-time matrix $S_t$;
wherein transmitting the respective one of elements in the space-time matrix $S_t$ comprises transmitting an information bit made by a respective one of elements in the space-time matrix $S_t$ using a respective activated transmitter antenna; and
decoding the respective one of the demodulated information bits comprises decoding the multiple reception symbols $Y_t = H_t S_t + N_t$ received by the receiver based on a transmitter-centric sphere decoding detection algorithm to decode the demodulated information bits to obtain decoded constellation symbols.

14. The method of claim 13, wherein the decoded constellation symbols are represented by $$[\hat{X}_{DSM}^{Tx\text{-}SD}] = \text{argmin}_{\overline{X} \in O_c} \{\|\overline{Y}_t^Q - R\overline{X}_t\|^2 \leq C_R^2\},$$

wherein argmin{.} is a function for obtaining a minimum value in a group $O_c$ of $\overline{X}$ within a search radius $C_R$ for the current timeslot, $\overline{Y}_t^Q$ represents multiple reception symbols $Y_t$ left-multiplying a positive definite matrix Q, $$\overline{Y}_t = [\text{Re}(Y_t), \text{Im}(Y_t)]^T,$$

$$R = \begin{bmatrix} \text{Re}(Q^H \overline{Y_{t-1}}), & -\text{Im}(Q^H \overline{Y_{t-1}}) \\ \text{Re}(Q^H \overline{Y_{t-1}}), & \text{Im}(Q^H \overline{Y_{t-1}}) \end{bmatrix},$$

$$\overline{X}_t = [\text{Re}(\overline{X}_t^T), \text{Im}(\overline{X}_t^T)]^T,$$

$$Q^H \overline{Y_{t-1}} = QR$$

$$= \begin{cases} [Q_{1[2n_r \times 2n_t]} Q_{2[2n_r \times 2(n_r - n_t)]}] \begin{bmatrix} R_{1[2n_t \times 2n_t]} \\ 0_{[2(n_r - n_t) \times 2n_t]} \end{bmatrix} & n_r \geq n_t \\ Q_{1[2n_r \times 2n_r]} [R_{1[2n_r \times 2n_r]} R_{2[2n_r \times 2(n_t - n_r)]}] & n_r < n_t \end{cases},$$

where $Q_H$ is a conjugate transposition of matrix Q, $n_r$ represents numbers of receiving antennas, and $n_t$ represent numbers of transmitting antennas; $Q = [Q_1, Q_2]$; $R = [R_1, R_2]$; $Q_1$ represents a $2n_r \times 2n_t$ matrix of Q; $Q_2$ represent a $2n_r \times (2n_r - 2n_t)$ matrix of Q; R represents an upper-triangular matrix; $R_1$ is a $2n_t \times 2n_t$ matrix of R when $n_r \geq n_t$, and is a $2n_r \times 2n_r$ matrix of R when $n_r < n_t$; and $R_2$ represents a $2n_r \times (2n_t - 2n_r)$ matrix of R.

15. The method of claim 14, wherein decoding the multiple reception symbols $Y_t$ comprises searching through a shortest searching path $\hat{T}$ among a group of searching paths $T_i$ in the constellation diagram to obtain the decoded constellation symbols, wherein the shortest searching path is represented by $$\hat{T} = \arg\min_{T_i \in Tree}\{\|Q_1^H \overline{Y}_t - R \times T_i\|^2 \leq C_Q^2 - \|Q_2^H \overline{Y}_t\|^2\}.$$

16. The method of claim 10, wherein decoding a respective one of the demodulated information bits comprises decoding the demodulated information bit of the current timeslot to obtain an output data bit containing a spatial bit and/or modulated bit, and storing the output data bit, if the spatial bit and/or modulated bit in a to-be-transmitted information bit of the current timeslot is different from a spatial bit and/or modulated bit in a to-be-transmitted information bit of a previous timeslot;
obtaining and storing an output data bit associated with the to-be-transmitted information bit of the previous timeslot to be the output data bit for the current timeslot, if the spatial bit and/or modulated bit in the to-be-transmitted information bit of the current timeslot is same as a spatial bit and/or modulated bit in the to-be-transmitted information bit of the previous timeslot.

17. A wireless communication apparatus comprising:
an encoder configured to encode input data bits of a current timeslot with a cross-Gray coding scheme to obtain coded information bits;
a modulator configured to map the coded information bits to respectively obtain multiple transmission symbols $X_t$ for the current timeslot in a constellation diagram;
a processor configured to convert the multiple transmission symbols $X_t$ to generate a space-time matrix $S_t$ of the current timeslot by incorporating spatial bits associated with orders of respective transmitting antennas based on a space-time matrix $S_{t-1}$ of a previous timeslot;
a transmitter configured to activate a respective one of $n_t$ number of transmitting antennas to transmit a respective one of elements in the space-time matrix $S_t$;
a receiver configured to have a respective one of $n_r$ number of receiving antennas to receive a respective one of multiple reception symbols $Y_t = H_t S_t + N_t$ based on channel gain defined by a channel transmission matrix $H_t$, wherein $N_t$ is a transmission noise vector in the current timeslot;
a demodulator configured to demodulate the multiple reception symbols $Y_t$ to obtain demodulated information bits; and
a decoder configured to decode a respective one of the demodulated information bits to obtain a respective one decoded constellation symbol from which an output data bit can be extracted and stored.

18. The wireless communication apparatus of claim 17, wherein the modulator comprises one selected from a Quadrature Amplitude Modulation (QAM) modulator, or a Phase shift Keying (PSK) modulator, or an Amplitude-Phase shift Keying (APSK) modulator to obtain modulated bits in terms of the multiple transmission symbols $X_t$, and the processor is configured to perform a convolution operation of the multiple transmission symbols $X_t$ of the current timeslot with the space-time matrix $S_{t-1}$ of the previous timeslot to generate the space-time matrix $S_t$ of the current timeslot.

19. The wireless communication apparatus of claim 17, wherein the decoder comprises a detector storing a receiver-centric sphere decoding detection algorithm executed to decode demodulated information bits to obtain decoded constellation symbols when the transmitter directly transmits the elements in the space-time matrix $S_t$ of the current timeslot without having the processor perform extra digital-data operations to the multiple transmission symbols $X_t$;

wherein the extra digital-data operations comprise:

estimating a channel transmission matrix $H_t$ of the current timeslot, $H_t = Y_{t-1} X_t - N_{t-1} X_t$, based on multiple reception symbols $Y_{t-1}$ received in the previous timeslot by a receiver of the wireless communication apparatus, $Y_{t-1} = H_{t-1} S_{t-1} + N_{t-1}$, where $H_{t-1}$ is a channel transmission matrix of the previous timeslot and $N_{t-1}$ is a noise vector in the previous timeslot;

converting both the multiple transmission symbols $X_t$ and the channel transmission matrix $H_t$ from a complex field to a real field; and performing an orthogonal triangulation decomposition to the channel transmission matrix $H_t$.

20. The wireless communication apparatus of claim 17, wherein the decoder comprises a detector storing a transmitter-centric sphere decoding detection algorithm executed to decode demodulated information bits to obtain decoded constellation symbols when the transmitter is configured to transmit the respective one of elements in the space-time matrix $S_t$ comprising to-be-transmitted information bits, after the processor is configured to convert the multiple transmission symbols $X_t$ to generate a space-time matrix $S_t$ of the current timeslot by performing:

estimating a channel transmission matrix $H_t$ of the current timeslot, $H_t = Y_{t-1} X_t - N_{t-1} X_t$, based on multiple reception symbols $Y_{t-1}$ received in the previous timeslot by a receiver of the wireless communication apparatus, $Y_{t-1} = H_{t-1} S_{t-1} + N_{t-1}$, where $H_{t-1}$ is a channel transmission matrix of the previous timeslot and $N_{t-1}$ is a noise vector in the previous timeslot;

converting both the multiple transmission symbols $X_t$ and the channel transmission matrix $H_t$ from a complex field to a real field; and performing an orthogonal triangulation decomposition to the channel transmission matrix $H_t$.

\* \* \* \* \*